June 13, 1967 M. C. ARYA 3,325,741

TIMING PULSE GENERATORS

Filed May 7, 1965 5 Sheets-Sheet 1

INVENTOR.
MICHAEL C. ARYA
BY Samuel Cohen
Attorney

TIMING PULSE GENERATORS

INVENTOR.
MICHAEL C. ARYA
BY
Samuel Cohen
Attorney

INVENTOR.
MICHEAL C. ARYA
BY Samuel Cohen
Attorney

June 13, 1967 M. C. ARYA 3,325,741

TIMING PULSE GENERATORS

Filed May 7, 1965 5 Sheets-Sheet 4

INVENTOR.
MICHAEL C. ARYA
BY Samuel Cohen
Attorney

June 13, 1967 M. C. ARYA 3,325,741

TIMING PULSE GENERATORS

Filed May 7, 1965 5 Sheets-Sheet 5

INVENTOR.
MICHEAL C. ARYA
BY Samuel Cohen
Attorney

United States Patent Office 3,325,741
Patented June 13, 1967

3,325,741

TIMING PULSE GENERATORS

Michael C. Arya, Stratford, N.J., assignor to Radio Corporation of America, a corporation of Delaware Filed May 7, 1965, Ser. No. 453,952
6 Claims. (Cl. 328—62)

This invention relates to new and improved timing pulse generators which are useful, for example, in data processing machines.

An object of the invention is to provide a timing pulse generator which is capable of relatively high speed operation.

Another object of the invention is to provide a timing pulse generator in which certain of the pulses can be skipped, if desired.

Another object of the invention is to provide a timing pulse generator which can generate pulses of variable duration. This feature of the circuit is very useful in asynchronously operating computers, as the pulse width can be controlled by a signal indicative of the completion of the asynchronous operation.

The timing pulse generator of the invention includes $n$ stages. Each $k$th stage includes an input gate responsive to the concurrent receipt of a repetitive pulse, such as a clock pulse, and to a second signal such as one received from the $$(k \underset{n}{\ominus} 1)\text{th}$$

stage, where $$\underset{n}{\ominus}$$

represents sum modulo $n$ subtraction. Each $k$th stage also includes a first flip-flop connected at a given one of its input terminals to the output terminal of the input gate. A pair of output gates are also included, the first such gate being connected to be enabled in response to the concurrent receipt of a signal from a given one of the output terminals of the flip-flop and the second such gate being connected to be enabled in response to the concurrent receipt of a signal from said given one of said output terminals and a signal from the input gate of the $$(k \underset{n}{\oplus} 1)\text{th}$$

stage, where $$\underset{n}{\oplus}$$

represents sum modulo $n$ addition. Each $k$th stage also includes a second flip-flop connected at a given one of its input terminals to the ouput terminal of the first output gate. Finally, each $k$th stage includes an output gate for the second flip-flop connected to be enabled by the concurrent receipt of a signal from one of the output terminals of the second flip-flop and a signal from the first output gate of the first flip-flop of the $$(k \underset{n}{\oplus} 1)\text{th}$$

stage.

The invention is discussed in greater detail below and is shown in the following drawings, of which:

FIGURES 1$a$ and 1$b$ define the manner in which the NOR gate and flip-flop employed in the circuits of this invention operate;

Figure 1A:
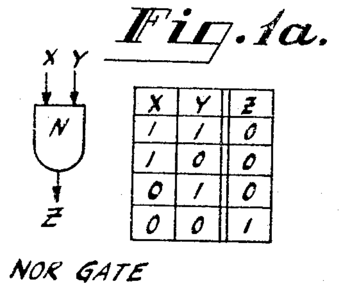
Figure 1B:
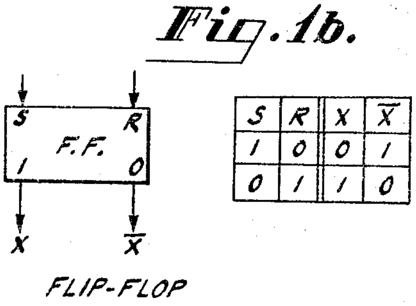

FIGURE 1$a$ illustrates a NOR gate and FIG. 1$b$ a flip-flop. The truth tables defining the operation of these circuits appear next to the NOR gate and the flip-flop, respectively. While convenient for purposes of explanation to define the operation of the NOR gate and flip-flop in terms of "1's" and "0's," in practice, "1" is represented by a voltage at a first level, and "0" by a voltage at a second level. It is arbitrarily assumed that a relatively high voltage level represents a "1" and a relatively low voltage level a "0". For the purpose of convenience in the explanation which follows, it is sometimes stated that a "1" or a "0" is applied to a circuit, rather than stating that a voltage level indicative of the binary digit "1" or "0" is applied to the circuit.

Figure 2:
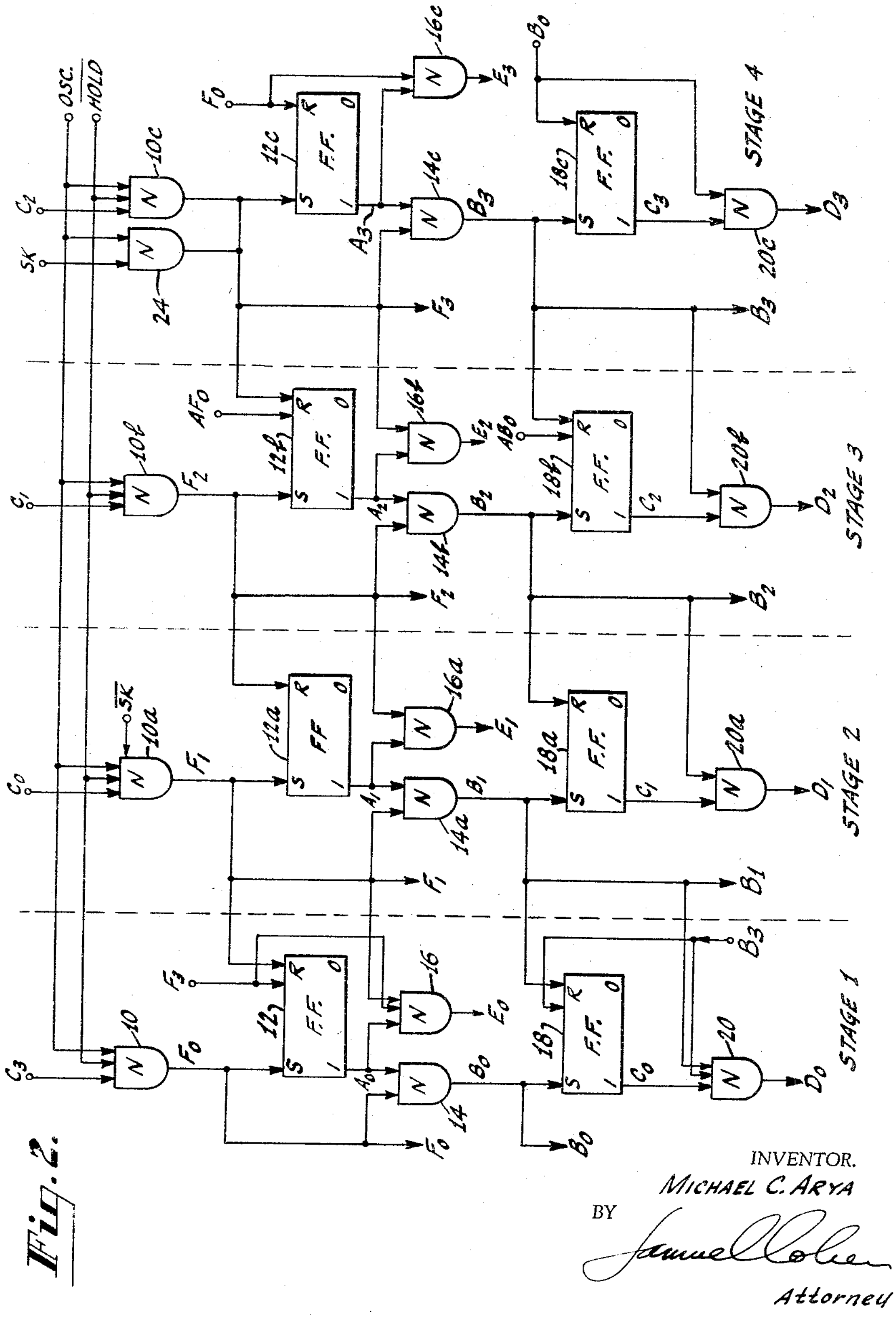
FIGURE 2 is a block circuit diagram of one form of timing pulse generator according to the invention.

The circuit of FIGURE 2 has four stages. Each $k$th stage includes an input NOR gate 10 connected at its output terminal to the set terminal (S) of a first flip-flop 12. (In the general case, $k$ is any integer from 1 to $n$, where the total number of stages is $n$. In the present example, there are four stages, so that $n=4$). The 1 output terminal of this flip-flop is connected to two NOR gates 14 and 16. The output terminal of NOR gate 14 is connected to the set terminal of a second flip-flop 18. The 1 output terminal of this second flip-flop is connected to a NOR gate 20.

To identify corresponding parts in the successive stages of the timing pulse generator of FIGURE 2, the same reference numerals with a letter added have been employed. Thus, the first flip-flop in stage 2 is legended 12$a$; in stage 3, is legended 12$b$; and so on. In addition to the various circuits discussed above, the last stage (stage 4 in this example) includes an additional NOR gate 24 at the input circuit to the first flip-flop 12$c$.

There are various feedback connections among the stages of the circuit of FIGURE 2. Thus, the first NOR gate of each $k$th stage receives as one input the output of the second flip-flop of the $$(k \underset{n}{\ominus} 1)\text{th}$$

stage. For example, NOR gate 10$a$ of the second stage receives as one input $C_0$, the output appearing at the 1 output terminal of the first stage. NOR gate 10 receives as one input the output $C_3$ of the flip-flop 18$c$ of the fourth stage, and so on. Each first flip-flop is reset by the output signal F from the $$(k \underset{n}{\oplus} 1)\text{th}$$

stage, where $$(k \oplus 1)$$

is the modulo $n$ sum of $n$ and 1. For example, flip-flop 12 of the first stage is reset by $F_1$, the output of the first NOR gate 10*a* of the second stage. Each second flip-flop is reset by the B output derived from the $$\frac{(k\oplus 1)\text{th}}{n}$$

stage, and so on. The second flip-flop 18 of the first stage also receives a reset signal $B_3$ from the last stage.

The operation of the circuit of FIGURE 2 is described by the waveforms of FIGURE 3 and the truth table of Table I below.

from "0" to "1" disabling NOR gate 10 and causing $F_0$ to change back to "0." The two inputs to NOR gate 14, $F_0$ and $A_0$, are now both "0," so that its output $B_0$ changes to "1." $B_0=1$ is a set signal for flip-flop 18 and a reset signal for flip-flop 18*c*. The setting of flip-flop 18 changes $C_0$ from "1" to "0." $B_3$ (derived from stage 4) is the second input to NOR gate 20 and is also a "0," and $B_1$, the third input to NOR gate 20, is also a "0." Accordingly, NOR gate 20 is enabled and $D_0$ changes from "0" to "1."

TABLE I

| | 1 | 2 | 3 | 4 | 5 | 6 | 7 | 8 | 9 | 10 | 11 | 12 |
|---|---|---|---|---|---|---|---|---|---|---|---|---|
| OSC. | 1 | 0 | 1 | 0 | 1 | 0 | 1 | 0 | 1 | 0 | 1 | |
| $\overline{\text{HOLD}}$ | 0 | 0 | 0 | 0 | 0 | 0 | 0 | 0 | 0 | 0 | 0 | |
| $A_0$ | 1 | 0 | 0 | 1 | 1 | 1 | 1 | 1 | 1 | 0 | | |
| $A_1$ | 1 | 1 | 1 | 0 | 0 | 1 | 1 | 1 | 1 | 1 | | |
| $A_2$ | 1 | 1 | 1 | 1 | 1 | 0 | 0 | 1 | 1 | 1 | | |
| $A_3$ | 0 | 1 | 1 | 1 | 1 | 1 | 1 | 0 | 0 | 1 | | |
| $B_0$ | 0 | 0 | 1 | 0 | 0 | 0 | 0 | 0 | 0 | 0 | | |
| $B_1$ | 0 | 0 | 0 | 0 | 1 | 0 | 0 | 0 | 0 | 0 | | |
| $B_2$ | 0 | 0 | 0 | 0 | 0 | 0 | 1 | 0 | 0 | 0 | | |
| $B_3$ | 1 | 0 | 0 | 0 | 0 | 0 | 0 | 0 | 1 | 0 | | |
| $C_0$ | 1 | 1 | 0 | 0 | 1 | 1 | 1 | 1 | 1 | 1 | | |
| $C_1$ | 1 | 1 | 1 | 1 | 0 | 0 | 1 | 1 | 1 | 1 | | |
| $C_2$ | 1 | 1 | 1 | 1 | 1 | 1 | 0 | 0 | 1 | 1 | | |
| $C_3$ | 0 | 0 | 1 | 1 | 1 | 1 | 1 | 1 | 0 | 0 | | |
| $D_0$ | 0 | 0 | 1 | 1 | 0 | 0 | 0 | 0 | 0 | 0 | | |
| $D_1$ | 0 | 0 | 0 | 0 | 1 | 1 | 0 | 0 | 0 | 0 | | |
| $D_2$ | 0 | 0 | 0 | 0 | 0 | 0 | 1 | 1 | 0 | 0 | | |
| $D_3$ | 1 | 1 | 0 | 0 | 0 | 0 | 0 | 0 | 1 | 1 | | |
| $E_0$ | 0 | 1 | 1 | 0 | 0 | 0 | 0 | 0 | 0 | 1 | | |
| $E_1$ | 0 | 0 | 0 | 1 | 1 | 0 | 0 | 0 | 0 | 0 | | |
| $E_2$ | 0 | 0 | 0 | 0 | 0 | 1 | 1 | 0 | 0 | 0 | | |
| $E_3$ | 1 | 0 | 0 | 0 | 0 | 0 | 0 | 1 | 1 | 0 | | |
| $F_0$ | 0 | 1 | 0 | 0 | 0 | 0 | 0 | 0 | 0 | 1 | | |
| $F_1$ | 0 | 0 | 0 | 1 | 0 | 0 | 0 | 0 | 0 | 0 | | |
| $F_2$ | 0 | 0 | 0 | 0 | 0 | 1 | 0 | 0 | 0 | 0 | | |
| $F_3$ | 0 | 0 | 0 | 0 | 0 | 0 | 0 | 1 | 0 | 0 | | |
| $\overline{\text{SK}}$ | 0 | 0 | 0 | 0 | 0 | 0 | 0 | 0 | 0 | 0 | | |

Initially, flip-flops 12, 12*a* and 12*b* are assumed to be reset and flip-flop 12*c* to be set. Also, flip-flops 18, 18*a* and 18*b* are reset and flip-flop 18*c* is set. The signal SK, which is a signal derived from the signal SC (FIG. 4) from the control area of the computer, is a "1," so that $\overline{SK}=0$. This signal is the skip command and when it is 0 ($\overline{SK}=0$), the circuit of FIGURE 2 does not skip any pulses, as is clear from Table I and from the discussion which follows.

As the flip-flop 18*c* is set, $C_3$ is a "0." The $\overline{\text{HOLD}}$ input to NOR gate 10 is also a "0." If now the oscillator signal changes from "1" to "0," NOR gate 10 becomes enabled and $F_0$ changes from "0" to "1." $F_0=1$ is a set signal for flip-flop 12 and a reset signal for flip-flop 12*c*. Thus, $A_0$ changes from "1" to "0," and $A_3$ changes from "0" to "1." $F_3$ (an output of stage 4 and an input to NOR gate 16) is initially "0," and $F_1$ is also a "0." Therefore, when $A_0$ changes to "0," NOR gate 16 is enabled and it produces an output $E_0=1$.

During the next half-cycle, the oscillator output changes

The remaining stages of the timing pulse generator of FIGURE 2 operate quite similarly to stage 1 and need not be discussed in detail. Their operation can readily be understood with the aid of the truth table and waveforms of FIGURE 3.

Figure 3:
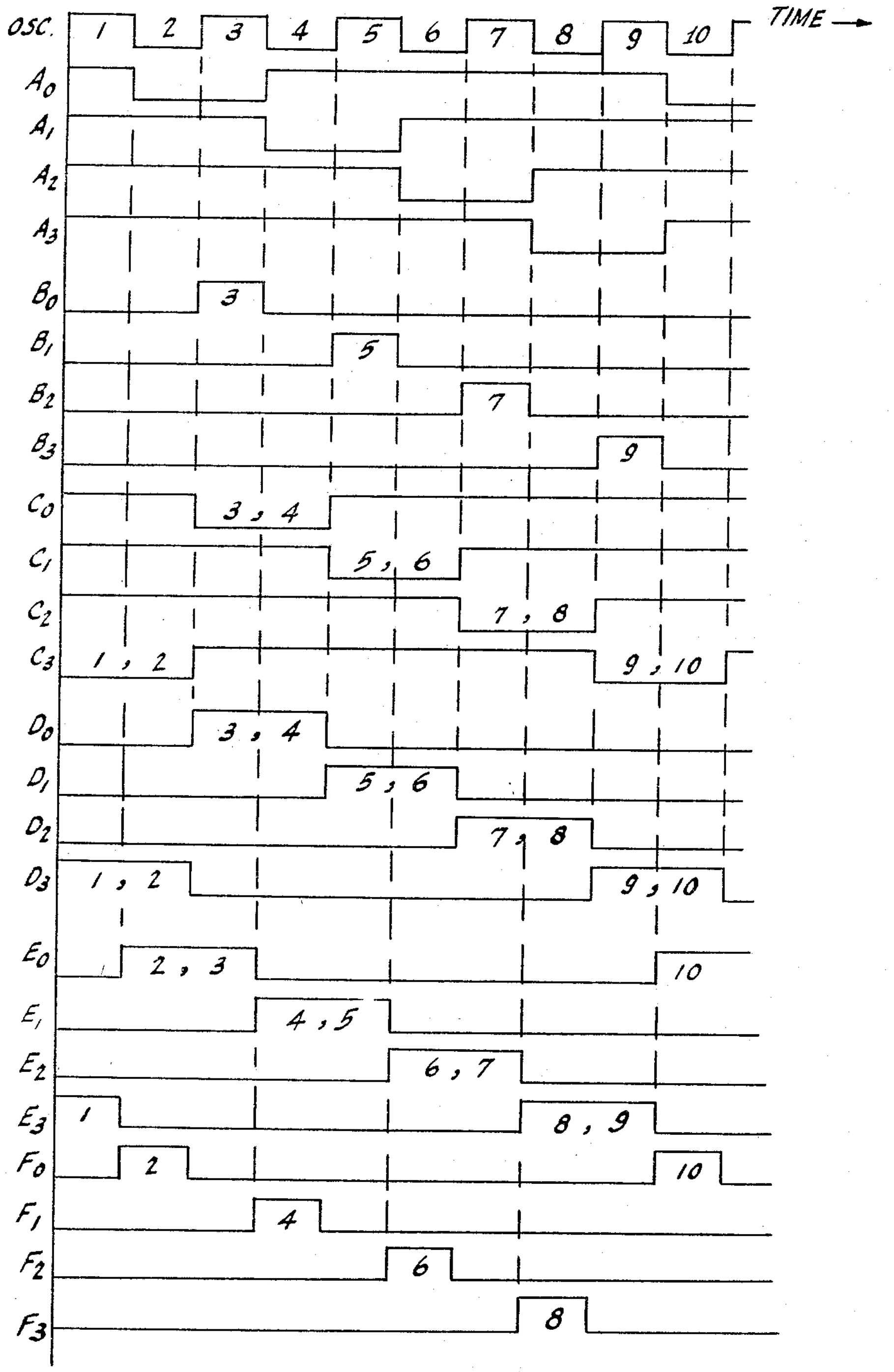
FIGURE 3 is a drawing of waveforms generated in the circuit of FIGURE 2 when operating to produce successive pulses without skipping.

A number of the different pulse trains shown in FIGURE 3 may be employed for timing purposes either singly or in combination. The "basic" pulses, for example, may be the pulses $E_0$, $E_1$, $E_2$, $E_3$. These are four time-sequential positive-going pulses, the leading edge of each pulse occurring at the lagging edge of the immediately preceding pulse. The group of pulses $D_0$, $D_1$, $D_2$, $D_3$ is a second group of four positive-going pulses with each pulse $D_k$ overlapping the last half of the corresponding pulse $E_k$. Thus, the D pulses may be considered as delayed pulses. The pulse groups $A_0$, $A_1$, $A_2$, $A_3$ comprises four, time-sequential, negative-going pulses. The pulse group $C_0$, $C_1$, $C_2$, $C_3$ comprises four, time-sequential, delayed negative pulses.

Figure 5:
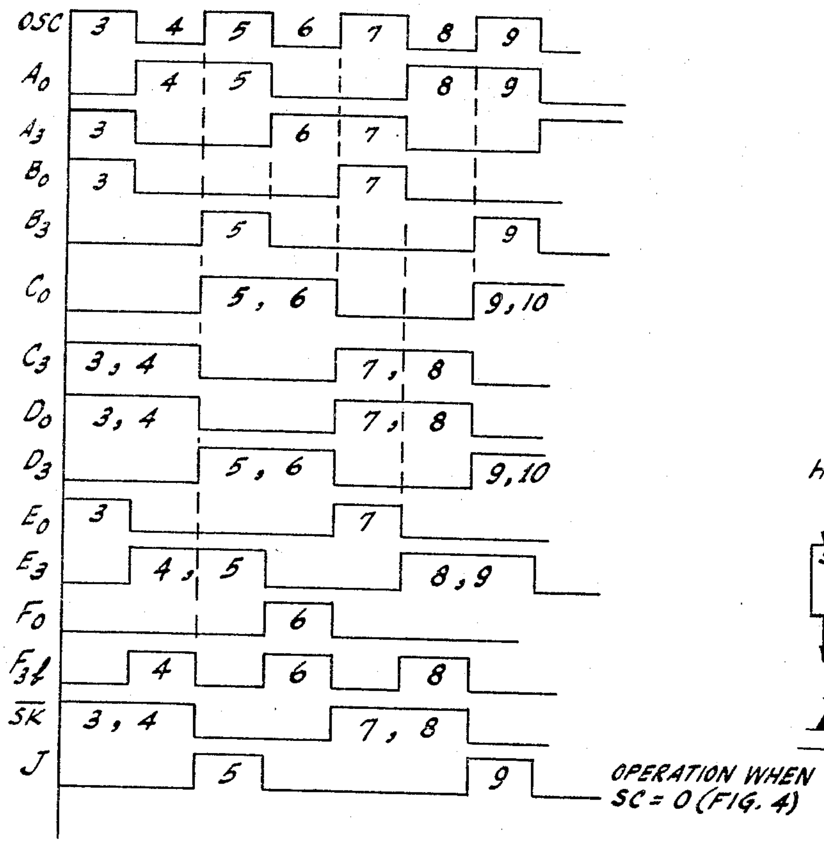
FIGURE 5 is a drawing of waveforms generated in the circuit of FIGURE 2 when certain pulses are skipped.

If the skip command SK of FIG. 2 is changed from "1"

to "0," then the pulses generated by the second and third stages will be skipped. After the first pulse $E_0$ occurs (time periods 2 and 3 of Table I), the pulse $E_3$ occurs (time periods 4 and 5 of Table II below). After the first delayed pulse $D_0$ occurs (time periods 3 and 4 of Tables I and II), the fourth pulse $D_3$ occurs (time periods 5 and 6 of Table II). This operation is fully set forth in Table II below and is also illustrated by the waveforms of FIGURE 5.

TABLE II

| | 3 | 4 | 5 | 6 | 7 | 8 | 9 |
|---|---|---|---|---|---|---|---|
| OSC. | 1 | 0 | 1 | 0 | 1 | 0 | 1 |
| $\overline{\text{HOLD}}$ | 0 | 0 | 0 | 0 | 0 | 0 | 0 |
| $A_0$ | 0 | 1 | 1 | 0 | 0 | 1 | 1 |
| $A_1$ | 1 | 1 | 1 | 1 | 1 | 1 | 1 |
| $A_2$ | 1 | 1 | 1 | 1 | 1 | 1 | 1 |
| $A_3$ | 1 | 0 | 0 | 1 | 1 | 0 | 0 |
| $B_0$ | 1 | 0 | 0 | 0 | 1 | 0 | 0 |
| $B_1$ | 0 | 0 | 0 | 0 | 0 | 0 | 0 |
| $B_2$ | 0 | 0 | 0 | 0 | 0 | 0 | 0 |
| $B_3$ | 0 | 0 | 1 | 0 | 0 | 0 | 1 |
| $C_0$ | 0 | 0 | 1 | 1 | 0 | 0 | 1 |
| $C_1$ | 1 | 1 | 1 | 1 | 1 | 1 | 1 |
| $C_2$ | 1 | 1 | 1 | 1 | 1 | 1 | 1 |
| $C_3$ | 1 | 1 | 0 | 0 | 1 | 1 | 0 |
| $D_0$ | 1 | 1 | 0 | 0 | 1 | 1 | 0 |
| $D_1$ | 0 | 0 | 0 | 0 | 0 | 0 | 0 |
| $D_2$ | 0 | 0 | 0 | 0 | 0 | 0 | 0 |
| $D_3$ | 0 | 0 | 1 | 1 | 0 | 0 | 1 |
| $E_0$ | 1 | 0 | 0 | 0 | 1 | 0 | 0 |
| $E_1$ | 0 | 0 | 0 | 0 | 0 | 0 | 0 |
| $E_2$ | 0 | 0 | 0 | 0 | 0 | 0 | 0 |
| $E_3$ | 0 | 1 | 1 | 0 | 0 | 1 | 1 |
| $F_0$ | 0 | 0 | 0 | 1 | 0 | 0 | 0 |
| $F_1$ | 0 | 0 | 0 | 0 | 0 | 0 | 0 |
| $F_2$ | 0 | 0 | 0 | 0 | 0 | 0 | 0 |
| $F_3$ | 0 | 1 | 0 | 1 | 0 | 1 | 0 |
| $\overline{\text{SK}}$ | 1 | 1 | 0 | 0 | 1 | 1 | 0 |

Discussing briefly for a moment the skip operation, when SK changes to "0" (a change of $\overline{\text{SK}}$ to "1") NOR gate 10*a* of stage 2 is disabled. This interruption of the operation of stage 2 causes its second flip-flop 13*a* to remain reset and $C_1$ to remain equal to "1." $C_1$ is one of the inputs to NOR gate 10*b* of stage 3, and it (disabled NOR gate 10*b*) effectively maintains stage 3 disabled. The change of SK to "0" primes NOR gate 24 of stage 4. Therefore, when the oscillator output changes from "1" to "0," NOR gate 24 becomes enabled and sets flip-flop 12*c*. The remainder of the circuit operation is believed to be clear from Table II.

Figure 4:
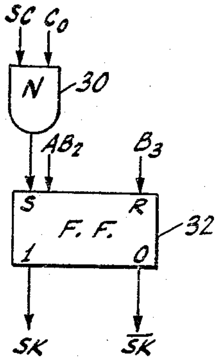
FIGURE 4 is a block circuit diagram of a control circuit associated with the timing pulse generator of FIGURE 2.

A simple control circuit which may be employed for generating the skip command SK is shown in FIGURE 4. It includes a NOR gate 30 connected to the set input terminal of a flip-flop 32. The NOR gate receives two inputs, one $C_0$ from the first stage and the other SC from the control area of the computer. When the computer desires the timing pulse generator to skip in the manner discussed in detail above, it generates a command $SC=0$. The next time $C_0=0$ occurs, NOR gate 30 of FIG. 4 becomes enabled, setting flip-flop 32 and causing SK to change from "1" to "0." After the skip has occurred, NOR gate 14*c* of stage 4 (FIG. 2) produces an output $B_3=1$. This is the resetting signal for flip-flop 32. Thus, in the absence of another $SC=0$ signal from the control area of the computer, the next cycle of the operation of the timing pulse generator of FIGURE 2 is a normal cycle, since SK is changed back to "1."

The timing pulse generator of FIGURE 2 can be made to hold any group of pulses it has generated for any desired time interval. This is accomplished by changing the $\overline{\text{HOLD}}$ command from a "0" to a "1." Doing this disables all of the input gates 10 and prevents the timing pulse generator from continuing to its next cycle. For example, if the $\overline{HOLD}=1$ command is initiated during the third interval of FIGURE 3 and maintained on until slightly after the beginning of the fifth interval, the pulse pattern shown at the third interval will be retained until the oscillator output changes from "1" to "0" at the beginning of the sixth interval. In other words, the $\overline{HOLD}=1$ command will cause the pulse pattern generated to be held for the third, fourth and fifth intervals. The oscillator pulses (OSC.) will then automatically lock the timing pulse generator back into correct synchronism.

The hold feature above is very useful in connection with asynchronous data processing machines. In such machines, the $\overline{HOLD}=1$ command may be initiated by a signal from the control area of the computer or, in fact, by a signal generated by the timing pulse generator itself which initiated some asynchronous computer operation, as, for example, asynchronous addition. And, the hold command may be terminated (the changing of $\overline{\text{HOLD}}$ back to 0) in response to a signal derived from the asynchronous stage itself, this signal being an indication from the asynchronous stage that it has completed its operation. A simple control circuit receptive of a termination signal $AOC=0$ (*A*rithmetic *O*peration *C*ompleted) of this type may be similar to the one shown in FIGURE 7 which is discussed later in connection with FIGURE 6.

Another application of the hold feature of the present invention aside from the asynchronous hold feature already discussed, is the ability of the circuit to hold up the pulses it is generating for a definite time interval ("synchronous hold"). During this definite time interval an auxiliary timing pulse generator, known colloquially as a "sub-clock" pulse generator, may be started and permitted to pass through one complete operating cycle.

Figure 8:
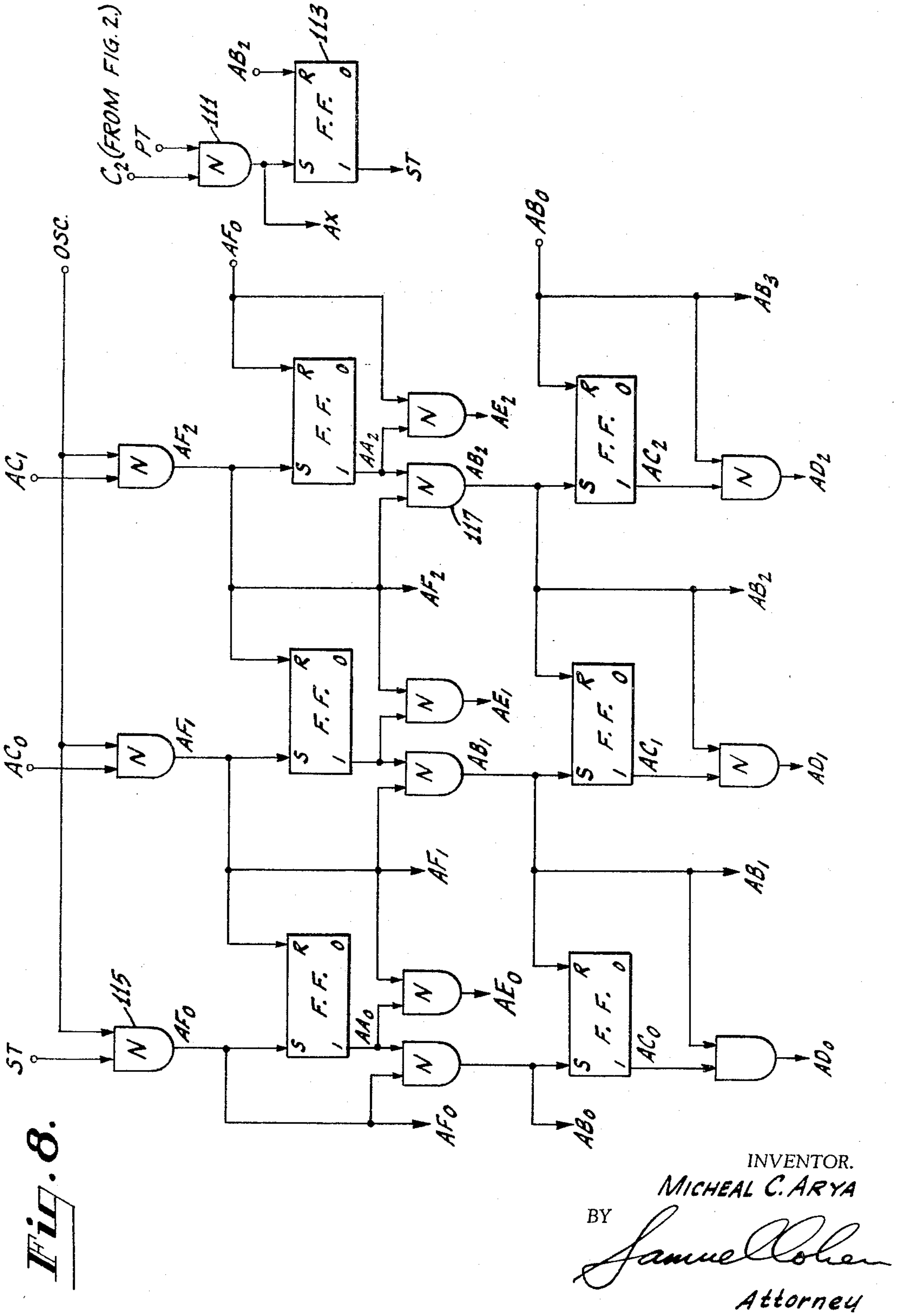
FIGURE 8 is a block circuit diagram of a "sub-clock" pulse generator which may be interconnected with a pulse generator such as shown in FIGURE 2.

A suitable sub-clock pulse generator, in accordance with the invention, is shown in FIG. 8. This generator is quite analogous to the one of FIG. 2, as should be evident from the close similarity of the two figures. For purposes of identification, the prefix A is added to the various signals to distinguish them from the corresponding signals generated in the circuit of FIG. 2.

In the circuit shown in FIG. 8, it is assumed that it is desired to start the sub-clock generator after flip-flop 18*b* of FIG. 2 is set. The $C_2=0$ output of flip-flop 18*b* and a command $PT=0$ from the control area of the computer are applied to the NOR gate 111 at the upper right of FIG. 8. The $AX=1$ signal thereby generated by NOR gate 111 sets flip-flop 113 and causes it to produce a start signal $ST=0$. This start signal applied to NOR gate 115 at the upper left of FIG. 8 starts the sub-clock generator and it goes through its operating cycle in a manner quite analogous to that discussed in connection with FIG. 2.

Figure 7:
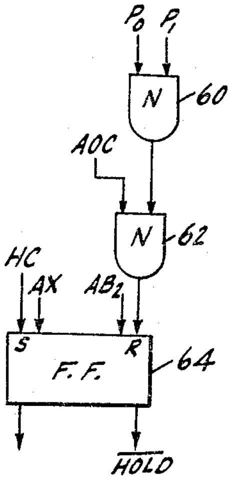
FIGURE 7 is a block circuit diagram of a control circuit associated with the circuit of FIGURE 6.

The AX signal generated by NOR gate 111 sets a hold flip-flop similar to the one of FIG. 7. The set flip-flop generates the command $\overline{HOLD}=1$ which stops the main clock generator, in the manner already discussed.

The start and hold flip-flops 113 of FIG. 8 and 64 of FIG. 7 are reset by the signal $AB_2$ from gate 117 of FIG. 8. This changes ST back to 1 and $\overline{\text{HOLD}}$ back to 0. The $AB_2$ signal also serves as a set signal for the flip-flop of FIG. 4 to change SK to 0 and thereby enable the main pulse generator of FIG. 2 to complete its operating cycle.

Figure 6:
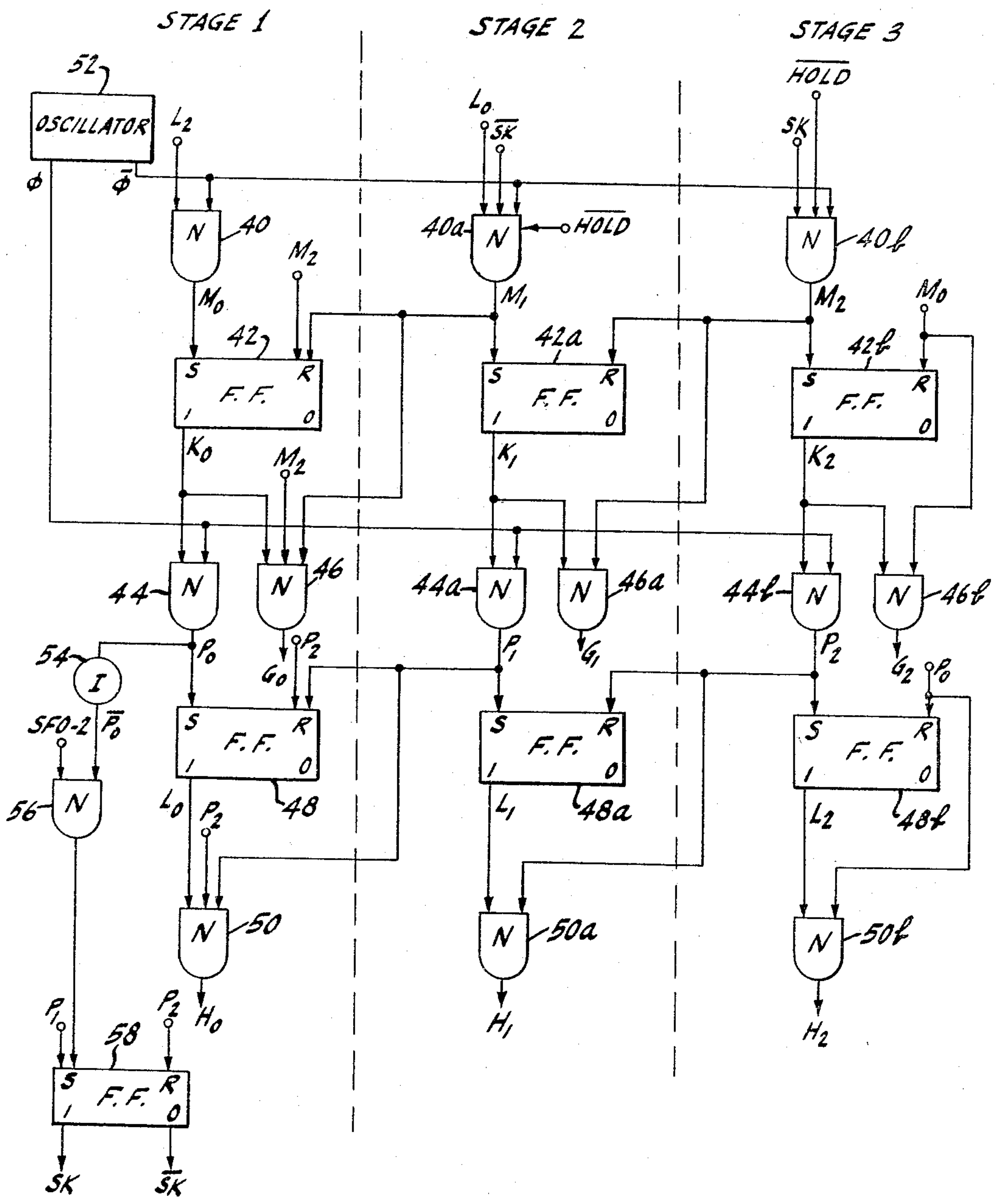
FIGURE 6 is a block circuit diagram of another form of timing pulse generator according to the invention.

FIGURE 6 is a diagram of a somewhat simplified timing pulse generator operating on the same principles as the one of FIGURE 2. Each *k*th stage of the generator of FIGURE 6 includes an input NOR gate 40 connected to the set terminal of a first flip-flop 42. The "1" output terminal of flip-flop 42 is connected to two output NOR gates 44 and 46. NOR gate 44 is connected to the set terminal of a second flip-flop 48. The "1" output terminal of flip-flop 48 is connected to the NOR gate 50.

As in the embodiment of FIGURE 2, there are various feedback connections among the stages. Flip-flop 42, for example, receives a reset signal from the $M_1$ output of NOR gate 40*a* and receives a reset signal also from the $M_2$ output of NOR gate 40*b*. NOR gate 46 receives inputs $M_2$ and $M_1$. Flip-flop 48 receives reset signals $P_1$ and $P_2$, and NOR gate 50 receives these same signals.

A clock pulse source for the generator of FIGURE 6 is oscillator 52. It applies a pulse train $\overline{\Phi}$ in one phase to the NOR gates 40, 40*a* and 40*b*, and a pulse train $\Phi$ of opposite phase to the NOR gates 44, 44*a* and 44*b*. While this arrangement is somewhat different from that of FIGURE 2, the effect achieved is similar. Thus, in FIGURE 2 when the oscillator output is a "1," NOR gates 10 produce a "0" and this "0" output is applied to the NOR gates 14.

The $P_0$ output of NOR gate 44 is applied through an inverter 54 to one input to NOR gate 56. The output of this NOR gate is applied to the set terminal of flip-flop 58. The set terminal also receives a signal $P_1$ from the next stage, and the reset terminal (R) of the flip-flop receives a signal $P_2$ from the last stage.

The operation of the circuit of FIGURE 6, when it does not skip any pulses, is given succinctly in Table III below.

TABLE III

| | 1 | 2 | 3 | 4 | 5 | 6 | 7 |
|---|---|---|---|---|---|---|---|
| $\Phi$ | 1 | 0 | 1 | 0 | 1 | 0 | 1 |
| $\overline{\Phi}$ | 0 | 1 | 0 | 1 | 0 | 1 | 0 |
| $G_0$ | 1 | 1 | 0 | 0 | 0 | 0 | 1 |
| $G_1$ | 0 | 0 | 1 | 1 | 0 | 0 | 0 |
| $G_2$ | 0 | 0 | 0 | 0 | 1 | 1 | 0 |
| $H_0$ | 0 | 1 | 1 | 0 | 0 | 0 | 0 |
| $H_1$ | 0 | 0 | 0 | 1 | 1 | 0 | 0 |
| $H_2$ | 1 | 0 | 0 | 0 | 0 | 1 | 1 |
| $K_0$ | 0 | 0 | 1 | 1 | 1 | 1 | 0 |
| $K_1$ | 1 | 1 | 0 | 0 | 1 | 1 | 1 |
| $K_2$ | 1 | 1 | 1 | 1 | 0 | 0 | 1 |
| $L_0$ | 1 | 0 | 0 | 1 | 1 | 1 | 1 |
| $L_1$ | 1 | 1 | 1 | 0 | 0 | 1 | 1 |
| $L_2$ | 0 | 1 | 1 | 1 | 1 | 0 | 0 |
| $M_0$ | 1 | 0 | 0 | 0 | 0 | 0 | 1 |
| $M_1$ | 0 | 0 | 1 | 0 | 0 | 0 | 0 |
| $M_2$ | 0 | 0 | 0 | 0 | 1 | 0 | 0 |
| $P_0$ | 0 | 1 | 0 | 0 | 0 | 0 | 0 |
| $P_1$ | 0 | 0 | 0 | 1 | 0 | 0 | 0 |
| $P_2$ | 0 | 0 | 0 | 0 | 0 | 1 | 0 |
| $\overline{SK}$ | 0 | 0 | 0 | 1 | 1 | 0 | 0 |

As may be seen from the table, SK is initially a "1" and $\overline{SK}$ a "0." When flip-flop 42*a* is set (time period 3 in Table III), $G_1$ changes to "1" and $P_1$ is "0." During the next time period 4, $P_1$ changes to "1." $P_1=1$ is a set signal for flip-flop 58, changing SK from "1" to "0" and $\overline{SK}$ from "0" to "1." $SK=0$ is a priming signal for NOR gate 40*b* and permits stage 3 to produce outputs as set forth in the table. During time period 6, $P_2$ changes from "0" to "1." $P_2$ is a reset signal for flip-flop 58 and causes SK to change back to "1" and $\overline{SK}$ to change back to "0." $\overline{SK}=0$ is a priming signal for NOR gate 40*a* and permits the second stage to resume its normal operation.

If it is desired to skip from the first stage to the third stage, the control area of the computer will generate a command $SF0\text{–}2=0$ (skip from 0 to 2). Upon receipt of this command and the $\overline{P_0}=0$ signal, flip-flop 58 becomes set, changing $\overline{SK}$ from "0" to "1." This disables gate 40*a* and primes gate 40*b* and, when $\overline{\Phi}$ changes to "0," gate 40*b* becomes enabled.

The control circuit of FIGURE 7 is employed to generate the HOLD signal. It includes a NOR gate 60 which receives as inputs $P_0$ and $P_1$ and which applies its output to NOR gate 62. NOR gate 62 is connected to the reset terminal of flip-flop 64.

Flip-flop 64 normally is reset so that $\overline{HOLD}=0$. Accordingly, NOR gates 40*a* and 40*b* of stages 2 and 3 (FIG. 6) are normally primed. Upon generation of the hold command HC by the control area of the computer, flip-flop 64 becomes set, changing $\overline{HOLD}$ to "1" and disabling NOR gates 40*a* and 40*b*. It may be assumed that during this period an asynchronous operation is being performed. Upon the termination of this asynchronous operation, the asynchronous stage will generate a command AOC (asynchronous operation complete)$=0$. Upon receipt of this signal, NOR gate 62 generates a reset signal if either $P_0=1$ or $P_1=1$. Thus, the signal $\overline{HOLD}$ will change from "1" to "0" at such a time that the timing pulse generator of FIGURE 6 can lock into appropriate synchronization. For example, if AOC occurs, concurrently with $P_0=1$, then the next time $\overline{\Phi}$ changes to "0," NOR gate 40*a* will become enabled, and the pulse generator is back in synchronization.

While illustrated as a three-stage timing pulse generator in FIGURE 6, and as a four-stage timing pulse generator in FIGURE 2, there can be many more stages in either circuit. The fewer number of stages are given only by way of example. Further, while a skip operation is illustrated only for certain conditions, it is clear that any of the pulses can be skipped by the use of suitable control circuits, such as the ones illustrated, but receiving different combinations of inputs.

What is claimed is:

1. An *n* stage timing pulse generator, each *k*th stage of said generator comprising:

an input gate responsive to the concurrent receipt of a repetitive pulse and a second signal for producing an output at its output terminal;

a first flip-flop having set and reset input terminals and 1 and 0 output terminals, connected at a given one of its input terminals to the output terminal of said input gate;

a pair of output gates for the first flip-flop, the first connected to be enabled in response to the concurrent receipt of a signal from a given one of said output terminals of said flip-flop and a second signal, and second the connected to be enabled in response to the concurrent receipt of a signal from said given one of said output terminals and a signal from the input gate of the $(k\oplus 1)$th

*n* stage;

a second flip-flop having set and reset input terminals and 1 and 0 output terminals, connected at a given one of its input terminals to the output terminal of said first output gate; and an output gate for the second flip-flop connected to be enabled by the concurrent receipt of a signal from a given one of the output terminals of the second flip-flop, and a signal from the first output gate of the first flip-flop of the $$(k \underset{n}{\oplus} 1)\text{th}$$

stage;

where:

$n$ is an integer;

$k$ is any integer from 1 to $n$;

and $\underset{n}{\oplus}$ is the modulo $n$ sum

2. The pulse generator of claim 1, further including means for disabling the input gate of at least one of the $n$ stages and concurrently priming the input gate of the succeeding stage for causing the pulse generator to skip the pulses generated by said one stage.

3. The pulse generator of claim 1 further including means for disabling a plurality of said input gates for causing said pulse generator to retain the pattern being generated at the time said gates are disabled.

4. An $n$ stage timing pulse generator, each $k$th stage of said generator comprising:

an input gate responsive to the concurrent receipt of a repetitive pulse and a second signal for producing an output at its output terminal;

a first flip-flop having set and reset input terminals and 1 and 0 output terminals, connected at a given one of its input terminals to the output terminal of said input gate and at its other input terminal to the output terminal of the input gate of the $$(k \underset{n}{\oplus} 1)\text{th}$$

stage;

a pair of output gates for the first flip-flop, the first connected to be enabled in response to the concurrent receipt of a signal from a given one of said output terminals of said flip-flop and a second signal, and the second connected to be enabled in response to the concurrent receipt of a signal from said given one of said output terminals and a signal from the input gate of the $$(k \underset{n}{\oplus} 1)\text{th}$$

stage;

a second flip-flop having set and reset input terminals and 1 and 0 output terminals, connected at a given one of its input terminals to the output terminal of said first output gate and at its other input terminal to the output terminal of the first output gate of the $$(k \underset{n}{\oplus} 1)\text{th}$$

stage; and an output gate for the second flip-flop connected to be enabled by the concurrent receipt of a signal from a given one of the output terminals of the second flip-flop, and a signal from the first output gate of the first flip-flop of the $$(k \underset{n}{\oplus} 1)\text{th}$$

stage;

where:

$n$ is an integer;

$k$ is any integer from 1 to $n$;

and $\underset{n}{\oplus}$ is the modulo $n$ sum

5. An $n$ stage timing pulse generator, each $k$th stage of said generator comprising:

an input coincidence gate responsive to the concurrent receipt of a repetitive pulse and a second signal for producing an output at its output terminal;

a first flip-flop having set and reset input terminals and 1 and 0 output terminals, connected at its set terminal to the output terminal of said input gate and at its reset terminal to the output terminal of the input gate of the $$(k \underset{n}{\oplus} 1)\text{th}$$

stage;

a pair of output coincidence gates for the first flip-flop, the first connected to be enabled in response to the concurrent receipt of a signal from a given one of said output terminals of said flip-flop and a second signal, and the second connected to be enabled in response to the concurrent receipt of a signal from said given one of said output terminals and a signal from the input gate of the $$(k \underset{n}{\oplus} 1)\text{th}$$

stage;

a second flip-flop having set and reset input terminals and 1 and 0 output terminals, connected at its set terminal to the output terminal of said first output gate and at its reset terminal to the output terminal of the first output gate of the $$(k \underset{n}{\oplus} 1)\text{th}$$

stage; and an output coincidence gate for the second flip-flop connected to be enabled by the concurrent receipt of a signal from a given one of the output terminals of the second flip-flop and a signal from the first output gate of the first flip-flop of the $$(k \underset{n}{\oplus} 1)\text{th}$$

stage;

where:

$n$ is an integer;

$k$ is any integer from 1 to $n$;

and $\underset{n}{\oplus}$ is the modulo $n$ sum

6. A timing pulse generator as set forth in claim 5 wherein said coincidence gates are NOR gates.

No references cited.

ARTHUR GAUSS, *Primary Examiner.*

J. ZAZWORSKY, *Assistant Examiner.*